US 6,715,322 B2

United States Patent
De Hazan et al.

(10) Patent No.: US 6,715,322 B2
(45) Date of Patent: Apr. 6, 2004

(54) MANUFACTURE OF DEPRESSED INDEX OPTICAL FIBERS

(75) Inventors: Yoram De Hazan, Oley, PA (US); John Burnette MacChesney, Lebanon, NJ (US); Thomas Edward Stockert, Millburn, NJ (US); Christopher Alan White, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 384 days.

(21) Appl. No.: 09/755,914

(22) Filed: Jan. 5, 2001

(65) Prior Publication Data

US 2004/0000171 A1 Jan. 1, 2004

(51) Int. Cl.[7] ............................................... C03C 21/00
(52) U.S. Cl. ........................................ 65/397; 65/399
(58) Field of Search ........................ 65/397, 399, 414, 65/416, 417, 378, 427, 435, DIG. 16

(56) References Cited

U.S. PATENT DOCUMENTS

| 4,586,943 | A | * | 5/1986 | Kyoto et al. | 65/397 |
| 4,620,861 | A | * | 11/1986 | Berkey | 65/399 |
| 4,693,738 | A | * | 9/1987 | Hoshikawa et al. | 65/397 |
| 5,145,507 | A | * | 9/1992 | Kyoto et al. | 65/398 |
| 5,364,428 | A | * | 11/1994 | Kyoto et al. | 65/397 |
| 5,679,125 | A | * | 10/1997 | Hiraiwa et al. | 65/397 |
| 6,263,706 | B1 | * | 7/2001 | Deliso et al. | 65/397 |
| 6,405,567 | B1 | * | 6/2002 | Loeb et al. | 65/415 |

* cited by examiner

*Primary Examiner*—Peter Chin
*Assistant Examiner*—Carlos Lopez

(57) ABSTRACT

The process time required for fluorine doping of porous silica bodies to produce fluorine doped preforms for the manufacture of depressed index optical fibers is reduced by separating the doping step into a predeposit step, where "excess" fluorine is deposited on the silica particles, and a drive-in step where atomic fluorine is distributed into the silica particles. The drive-in step is conveniently combined with the sintering or consolidation step to further enhance the efficiency of the doping process.

8 Claims, 4 Drawing Sheets

MANUFACTURE OF DEPRESSED INDEX OPTICAL FIBERS

FIELD OF THE INVENTION

This invention relates to methods for making depressed index optical fibers and is directed more specifically to techniques for preparing preforms prior to fiber draw.

BACKGROUND OF THE INVENTION

Depressed clad optical fibers were developed in the early 1980's as an alternative to fibers with doped cores and less heavily doped, or undoped cladding. See, e.g., U.S. Pat. No. 4,439,007. Depressed cladding allows the use of fiber cores with relatively low doping, or no doping at all. These cores produce low optical loss.

Applications were developed for both single mode and multimode depressed clad fibers, and a variety of processes for the manufacture of depressed clad fibers were also developed. See e.g. U.S. Pat. No. 4,691,990, the disclosure of which is incorporated herein by reference.

Recently, there has been a renewed interest in depressed clad fibers for lightwave systems in which control of non-linear effects is important. For example, in four-wave mixing of optical frequencies in the 1.5–1.6 mm wavelength region where DWDM networks operate, a low slope, low dispersion fiber is required. A fiber structure that meets this requirement is one with multiple claddings including one or more of down-doped silica.

One technique for making depressed clad fibers is to dope the cladding of a silica core fiber with fluorine or boron, which produces cladding with a refractive index less than the silica core. For example, fibers with negative refractive index variations, $\Delta n$, in the range 0.05–0.7% can be obtained using fluorine doping.

More recently, fibers with down doped core regions have been proposed which have a core shell doped with fluorine and a center region doped with a conventional dopant such as germania. This produces a modified "W" index profile and is found to be desirable for dispersion control. Manufacture of these fibers typically involves a standard VAD process, but the process is complicated by the step of selectively doping the shell region with fluorine. Fluorine diffuses readily into the porous structure and it is difficult to prevent fluorine migration into the germania doped core region.

Fibers with depressed index cores or cladding can be produced using any of the conventional optical fiber production techniques, which include rod in tube processes, MCVD and PCVD (inside tube deposition processes), and VAD or OVD (outside tube deposition processes). For single mode depressed clad fibers, the rod-in-tube approach may be preferred due to the large amount of cladding material required. Preforms for these fibers require a high quality, low loss cladding tube. For fluorine doped cladding, a desirable option for preparing the fluorine doped cladding tube is by a sol-gel process. This process is described in detail in U.S. Pat. No. 5,240,488, which is incorporated herein by reference for those process details, In the sol-gel process a porous silica tube is produced, and then heated to consolidate it into a solid (vitreous) cladding tube. The rod is then inserted and the tube collapsed around the rod. Depressed clad optical fiber preforms can also be made using vapor axial deposition (VAD), or outside vapor deposition (OVD). Each of these processes produces an intermediate product which is a shaped porous particulate material that is then consolidated into a preform. For the purpose of this invention, the common ingredient in all of these techniques is that, at one stage in the preform fabrication process, the preform is a highly porous silica body. Porosity of these bodies is typically in the range of 50–90%, measured as volume of the voids to total volume of the body.

In the manufacture of fluorine doped preforms, it is convenient to dope the porous silica body with fluorine by "soaking" the cladding tube in a fluorine containing gas atmosphere with the cladding tube still in the porous state, i.e. prior to consolidation. The porosity of the cladding tube at this stage in the process allows the fluorine gas to easily permeate through the entire thickness of the wall of a cladding tube, and through the thickness of a core rod. The conventional practice is to diffuse fluorine into the silica body using an equilibrium doping process. In this process, the silica body is heated to a temperature of rapid diffusion, in the presence of a low partial pressure of fluorine, i.e. a partial pressure sufficient to supply a continuous flux of fluorine to maintain the equilibrium. For the stated An values, equilibrium requires low fluorine partial pressures ($10^{-3}$–$10^{-4}$ atmospheres). Using such low values limit the rate at which F can be incorporated into the body, thereby requiring excessively long process times, e.g. greater than 20 hours for even modest sized preforms. In some cases the high temperature soak using the equilibrium doping technique causes partial, premature consolidation of the porous cladding tube so that a gas equilibrium state is not reached before the pores close in the exterior portion of the porous cladding tube close. This prevents complete equilibrium of fluorine through the porous body, and the required low partial pressures of the equilibrium doping process, slows the incorporation to the point where unacceptably long process periods are required. For thick clad tubes, the processing times may be entirely prohibitive.

SUMMARY OF THE INVENTION

We have discovered a fluorine doping process for optical fiber preforms that accelerates the overall doping process by at least an order of magnitude. In this new process the surface regions of the individual particles in the porous body are deliberately overdoped, and the final desired doping level is achieved by solid/solid diffusion to the desired doping level. The process is characterized in part by effecting the fluorine diffusion step into the particles in an atmosphere free of fluorine. We refer to this process as incremental doping to distinguish it from the conventional equilibrium doping process.

DETAILED DESCRIPTION

Figure 1:
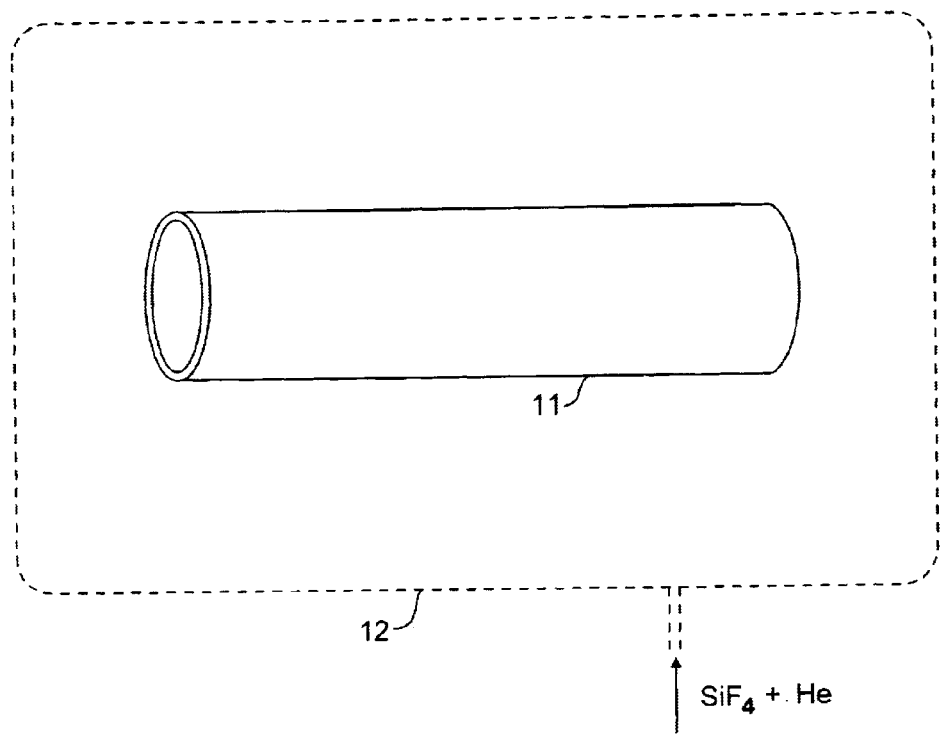
FIG. 1 is a representation of a porous cladding tube in a doping furnace.

A porous cladding tube 11, prior to consolidation into a sintered form suitable for optical fiber manufacture, is shown in FIG. 1. For consistency in nomenclature, and clear understanding of the invention, the term preform will refer to the final structure after consolidation or after assembly of the rod and tube, and collapse of the tube around the rod. The preform stage is the final fabrication stage of the glass prior to drawing the optical fiber. Where used, the term cladding tube refers to the glass tube into which the core glass rod is inserted to make a preform. In the context of cladding tubes made by sol gel or vapor deposition, or other equivalent process, the cladding tube may be referred to as porous, i.e. prior to consolidation, or simply a cladding tube which suggests that consolidation is complete and the tube is solid glass and ready for rod-in-tube assembly.

For convenience in describing the incremental doping process of the invention, the example used in this description is a cladding tube made by a sol-gel process. It will be understood that the invention applies equally to the manufacture of optical fibers using preforms made by any suitable technique that results in a porous body that is to be fluorine doped. As indicated earlier, these techniques include VAD, OVD, MCVD, etc. and the porous body may include both cladding tubes and core rods.

A sol gel technique useful for this embodiment of the invention is described in detail in U.S. Pat. Nos. 4,691,990 and 5,240,488. The basic steps are: forming a sol of water and fine dispersed silica particles, casting the sol into the desired mold to gel, drying the gelled body; all prior to processing to a glass tube. An example of this procedure follows.

A silica sol is prepared by dispersing a silica powder in water. The particulate comprising the powder typically has a surface area In the range of 10 to 200 m²/g. Examples of silica are various kinds of fumed silica sold under trade names Aerosil™ or Cab-O-Sil™. Alternatively, a commercially available silica sol may be used. Typical concentration levels in the sol are 30–70% by weight. A higher amount is beneficial, because it reduces shrinkage of the gel body. Other additives may be included in the silica sol, and to preserve the fluidity some additional water may be added to preserve approximately the same solid-to-water ratio as in the pure silica sol. The pH of the mixture is adjusted, using a water soluble base such as tetramethylammonium hydroxide (TMAH), to a pH level in the range 10–13, typically approximately 12.

The above prepared sol was gelled by lowering the pH over several minutes by adding 0.5–2%, typically 1%, of methyl formate (MF) or another acid producing media. The pH target is approximately 9. After adding the gelling agent, and before substantial gelling occurs, the sol is cast into the space between two concentric steel tubes to form the porous cladding tube. The inside diameter of the outer silica tube fixes the approximate outside diameter of the porous cladding tube and the outside diameter of the inside steel rod or tube determines the inside diameter of the porous cladding tube. The final dimensions of the consolidated cladding tube will be determined by the shrinkage of the gel upon drying and further shrinkage of the porous cladding tube during consolidation. These dimensional changes are well known, very reproducable, and are taken into account when designing the sol gel mold.

After gellation is complete the gel is dried for a period of several days to several weeks. The dried porous cladding tube is heated slowly to a temperature above 600° C. and preferably approximately 1100° C. to burn out organic additives and to strengthen the material for further handling. At this point the tube has sufficient integrity to be handled but is still porous.

Figure 2:
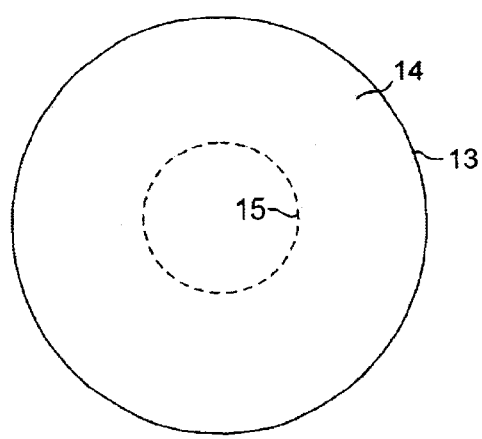
FIG. 2 is a schematic view of a section through a silica particle in the porous cladding tube being treated by the conventional equilibrium doping process.
Figure 3:
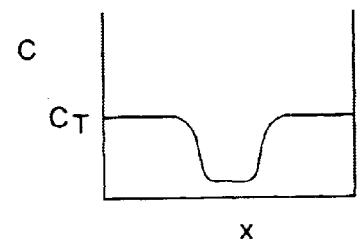
FIG. 3 is a representative plot of dopant concentration vs. distance through the thickness of the particle of FIG. 2.

The porous tube is then treated in a furnace 12, indicated schematically in FIG. 1, and a fluorine gas atmosphere is introduced into the furnace to provide the fluorine dopant for the porous cladding tube. The usual fluorine source is $SiF_4$ with a carrier gas such as argon or helium. The furnace atmosphere is heated to a temperature in the range 500–1200° C. for this step. Molecular $SiF_4$ permeates into the body through both the inside bore and outside surface of the porous cladding tube, thus penetrating the entire thickness of the tube. At the same time, diffusion of atomic fluorine begins at the particle surface. This effect is termed diffusion to define doping of the individual silica particles with elemental fluorine. The particle diffusion step is represented by FIG. 2, which shows an individual silica particle 13 doped with fluorine 14. The diffusion front 15 proceeds from the surface of the particle, which is exposed to the fluorine atmosphere, to the center of the particle. As Ad shown in FIG. 2, the diffusion is incomplete. The concentration of fluorine as a function of distance toward the center of the particle is represented by FIG. 3. The abscissa is the distance through the thickness of the particle and the ordinate is the concentration of fluorine C. The target concentration, for the desired index depression, is $C_T$.

It is recognized that the equilibrium doping process just described is inherently slow. The $\Delta n$ is proportional to the $SiF_4$ partial pressure to the quarter power:

$$\Delta n \sim P^{1/4} \qquad (1)$$

Figure 4:
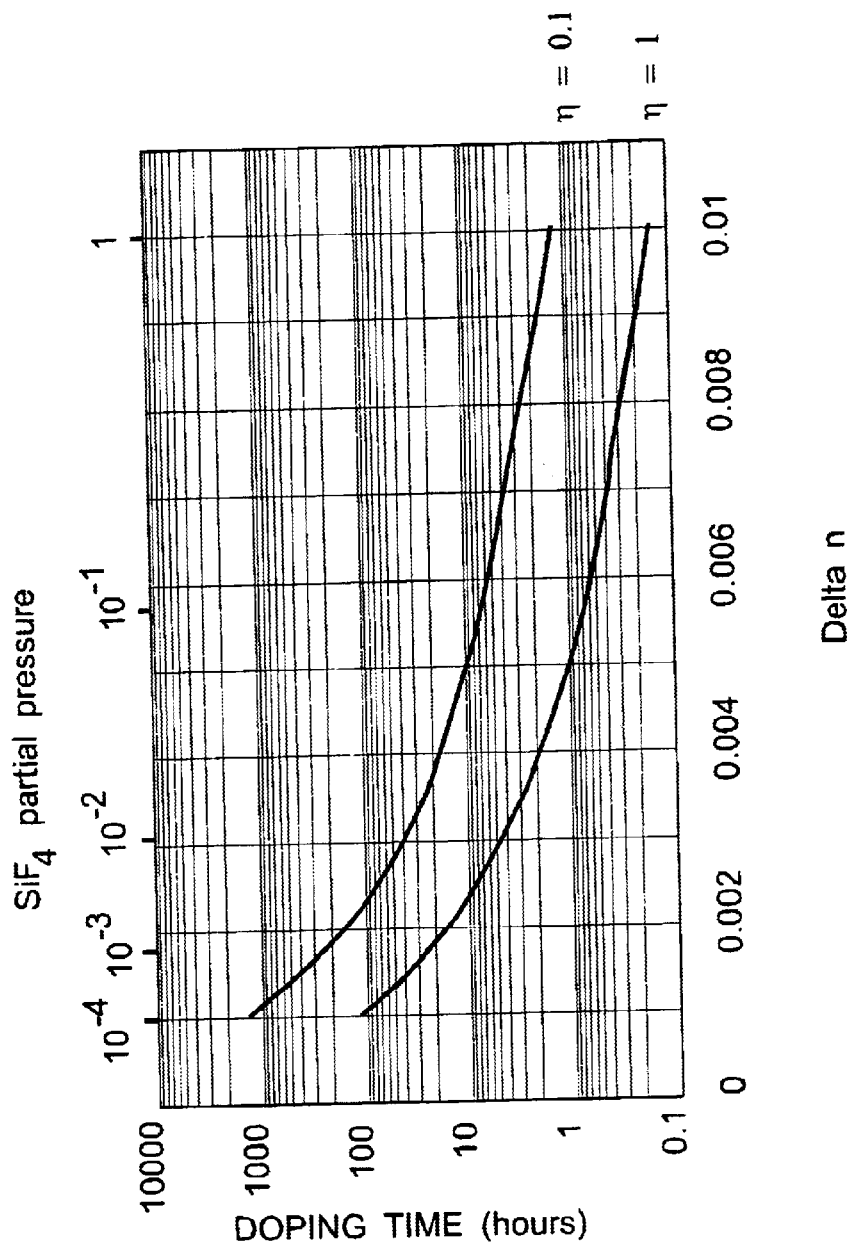
FIG. 4 is a plot of doping time vs. refractive index change for equilibrium doping processes.

The equilibrium partial pressures of $SiF_4$ corresponding to doping levels of $\Delta n=0.001-0.003$ are $1\times10^{-4}-8.0\times10^{-3}$, respectively. The doping of large porous bodies at intermediate and high $SiF_4$ partial pressures Is generally limited by mass transport in and into the porous body. However, in the low partial pressure regime used in equilibrium doping, the rate of $SiF_4$ introduction into the reaction vessel becomes the rate limiting step. Recently, the refractive index variation was found to be linearly related to the weight of $SiF_4$ incorporated. This can be used to estimate the dependence of the doping time scale on the $SiF_4$ partial pressure under this limiting condition. The doping time scale, $t_D$, can be defined by the ratio of the desired $\Delta n$ times the body mass divided by the $SiF_4$ partial pressure, $SiF_4$ mass, and the total flow, corrected by a doping efficiency, $\eta$, which is the fraction of $SiF_4$ incorporated in the sample to the total amount supplied. In terms of the total molar flow into the reactor, F, sample weight, W, and refractive index variation An, the doping time scale, $t_D$, is given by:

$$t_D \alpha (\Delta n W)/PFM)(1/\eta) \sim K \Delta n^4 (1/\eta) \sim K \Delta n^{-3}(1/\eta); K \sim W/(FM) \qquad (2)$$

where M and P are the molecular weight of $SiF_4$ and the partial pressure, respectively. The second step in the development of equation 2 uses the relationship from equation 1($\Delta n \sim P^{1/4}$). Equation 2 shows that for a given sample size and $SiF_4$ flow rate, the doping time scale $t_D$ is proportional to $\Delta n^{-3}$. This is illustrated in FIG. 4 for several process efficiencies. This example assumes 10 kg sample and 10 liters/min total volumetric flow. For the same doping efficiency, an order of magnitude decrease in $\Delta n$ results in an increase in doping time by three orders of magnitude. Doping times of 5 and 130 hours are expected for $\Delta n$ values of 0.003 and 0.001, respectively at 100% efficiency. Realistcally, these doping times are predicted to be an order of magnitude longer due to lower doping efficiencies. In practical terms, increasing the flow rate may not decrease doping times proportionally since this would result in an efficiency penalty due to the decrease in retention time. Decreasing sample size may also reduce efficiency and, more importantly, compromises throughput. At the higher $\Delta n$ values of FIG. 4, the predicted doping times due to introduction rates are very short. Thus the doping process in this regime is expected to be limited by diffusion in the porous body, further decreasing doping efficiencies. However, at the low doping levels, $\Delta n=0.001$–$0.003$, the doping process clearly becomes very time consuming due to the low rate of $SiF_4$ introduction into the reaction vessel.

To overcome the slow processing rates characteristic of equilibrium doping processes a fundamentally different doping approach is used. A high $SiF_4$ partial pressure, well above the equilibrium partial pressure, is used to predeposit excess fluorine as a surface layer on the particles of the porous body. In some cases, this predeposition step may be carried out at a temperature below the effective diffusion temperature for practical distribution of fluorine throughout the silica particles, i.e. 1000° C. or below. A range of 800–1000° C. is recommended. The fluorine deposits on the particle surface mainly by molecular absorption, which is essentially instantaneous compared with the time required for fluorine to penetrate substantially into the particle by atomic diffusion. Thus the total amount of fluorine required for the index modification of the preform is deposited as a concentrated surface layer in a relatively short doping step. This deposition of excess fluorine on the surface of the particles of the porous body is the first stage of the incremental doping process. Thereafter, the porous body is removed from the fluorine doping atmosphere (or decreased to equilibrium for $\Delta n<0.004$) and is exposed to a high temperature drive-in step to distribute the excess fluorine, as deposited, uniformly throughout the porous silica body. This drive-in step, the second stage of the incremental doping process, may be combined with the consolidation step of the process for further savings in process time.

Figure 5:
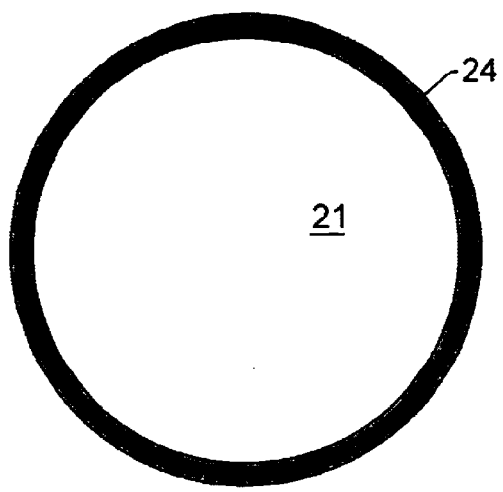
FIG. 5 is a schematic view of a section through a silica particle treated by the incremental doping process of the invention showing the dopant distribution after the predeposit step of the invention.

The incremental doping process of the invention is illustrated in FIGS. 5–8. FIG. 5 show an individual silica particle 21 of a porous silica body being treated in a fluorine atmosphere. The predeposited region 24 on the outside of the particle 21 is a region containing a high concentration of fluorine adsorbed on the surface of the particle. The concentration of fluorine in this surface layer is approximately in equilibrium with the atmosphere in furnace 12. The partial pressure of fluorine can be adjusted as desired but is preferably at least 5 times the equilibrium partial pressure corresponding to the final doping level for the entire preform. This high partial pressure will depend on the $\Delta n$ desired but will typically be greater than 1%. Using $SiF_4$ as the fluorine source, the predeposition atmosphere in general will contain $SiF_4$ in the range of 1–100%.

The temperature of the predeposition may vary widely, and in an ideal process depends in part on the porosity of the silica body. For very porous structures the $SiF_4$ permeation of the porous body may proceed rapidly, and temperatures up to 1200° C. may be used. For example, VAD soots characteristically have porosity levels of 80% or greater.

VAD core rods 15 cm. in diameter can be uniformly doped to an incremental amount, $\Delta n\sim 0.002$, in approximately 10 minutes at 1000° C. For less porous structures, the permeation process is typically longer, and premature consolidation should be avoided during this step. At the low end of the temperature range, e.g. 500° C., the predeposition process is slower. This end of the range is useful for producing small $\Delta n$ preforms with a relatively high degree of control, i.e. the doping concentration level varies more slowly and controllably with time. This temperature dependence feature adds another dimension of control to the process. The final doping level of the preform can be controlled by adjusting the predeposition temperature. In the equilibrium doping process, the doping level is controlled mainly by partial pressure of fluorine. The predeposition step proceeds to completion in a period typically in the range of 10–240 minutes.

The preferred temperature range for the predeposition step, to avoid any possibility of premature consolidation, is less than 1050° C. For the $\Delta n$ values of most interest for doping core regions, i.e. relatively small $\Delta n$ values, predeposition temperatures of 1000° C. or less allow for a desired level of control.

Figure 6:
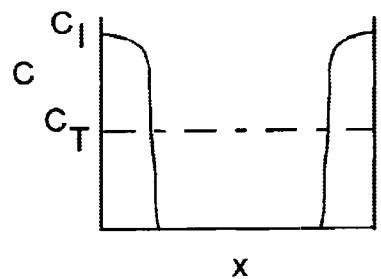
FIG. 6 is a representative plot of dopant concentration vs. distance for the particle of FIG. 5.

The concentration of fluorine in the particle 21 of FIG. 5 is shown schematically in FIG. 6 with axis x representing the diameter of the particle. The exterior region of the particle has a very high concentration of fluorine, i.e. well above the target concentration $C_T$. In the preferred case, the concentration of fluorine at the particle surface $C_I$ will be at least ten times $C_T$.

Figure 7:
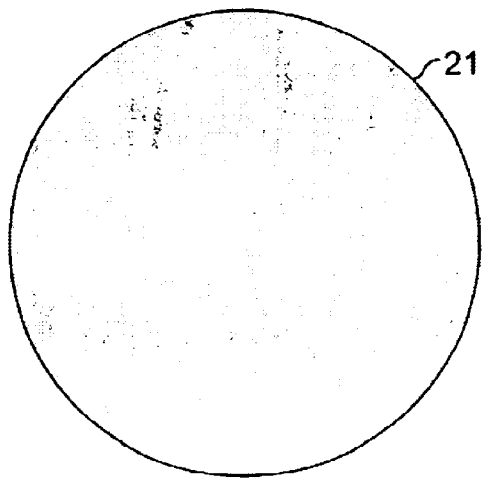
FIG. 7 is a schematic view of a section the particle of FIG. 5 showing the impurity distribution after the drive-in step of the invention.
Figure 8:
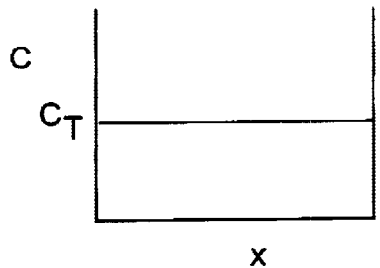
FIG. 8 is a representative plot of dopant concentration vs. distance through the particle of FIG. 7.

The drive-in or diffusion step is illustrated by FIGS. 7 and 8. The silica particle 21 in FIG. 7 is shown after drive-in with a uniform distribution of fluorine throughout the particle. The fluorine concentration profile for particle 21 is shown in FIG. 8, with uniform concentration $C_T$.

The drive-in step is preferably combined with the sintering step and is conducted at temperatures in the range 1300–1800° C. Alternatively, the porous silica body may be treated at a temperature of 1200–1400° C. for drive-in, then sintered for consolidation. The process time required for the drive-in/sintering step will vary depending on the size and geometry of the preform and the temperature used, but will typically be in the range 30–500 minutes. The overall process time, for both predeposit and drive-in/consolidation, may be less than an hour. This represents a dramatic reduction in process time as compared with prior methods of preparing fluorine doped preforms.

Figure 9:
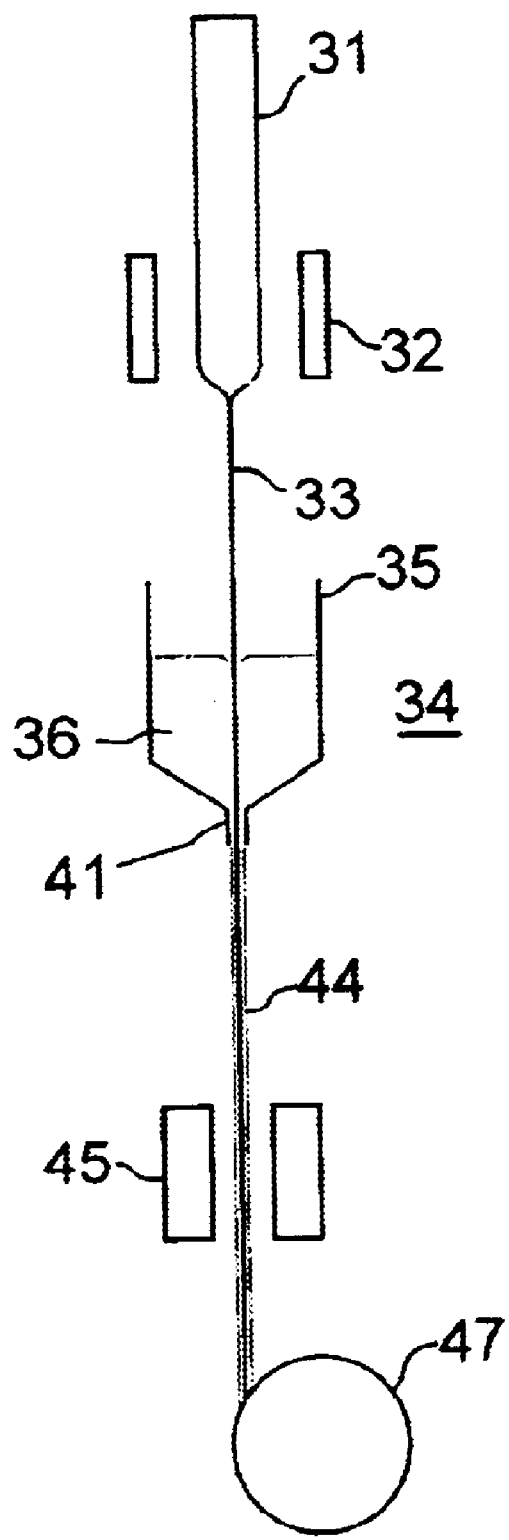
FIG. 9 is a schematic representation of an optical fiber drawing apparatus.

The sintered perform is then used for drawing optical fiber in the conventional way. FIG. 9 shows an optical fiber drawing apparatus with preform 31, and susceptor 32 representing the furnace (not shown) used to soften the glass preform and initiate fiber draw. The drawn fiber is shown at 33. The nascent fiber surface is then passed through a coating cup, indicated generally at 34, which has chamber 35 containing a coating prepolymer 36. The liquid coated fiber from the coating chamber exits through die 41. The combination of die 41 and the fluid dynamics of the prepolymer, controls the coating thickness. The prepolymer coated fiber 44 is then exposed to UV lamps 45 to cure the prepolymer and complete the coating process. Other curing radiation may be used where appropriate. The fiber, with the coating cured, is then taken up by take-up reel 47. The take-up reel controls the draw speed of the fiber. Draw speeds in the range typically of 1–20 m/sec. can be used. It is important that the fiber be centered within the coating cup, and particularly within the exit die 41, to maintain concentricity of the fiber and coating. A commercial apparatus typically has pulleys that control the alignment of the fiber. Hydrodynamic pressure in the die itself aids in centering the fiber. A stepper motor, controlled by a micro-step indexer (not shown), controls the take-up reel.

Coating materials for optical fibers are typically urethanes, acrylates, or urethane-acrylates, with a UV photoinitiator added. The apparatus is FIG. 9 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300$\mu$m in diameter, with approximately 240$\mu$m standard.

The following examples are given to illustrate the invention.

EXAMPLE 1

A porous silica cladding tube produced by a sol-gel process of the kind described above is heated to 1100° C., dehydrated with chlorine, cooled to 1000° C., and purged with He. At 1000° C., the porous tube is exposed to 10% $SiF_4$ in He, and soaked for 4 hours to predeposit $SiF_4$ on the particles of the porous body. The porous tube is then heated in helium to 1500° C. and sintered for 1 hour to consolidate the porous body. The finished tube has a $\Delta n$ of approximately 0.004. The tube is then used as overcladding for an MCVD or VAD core rod to produce a depressed index clad preform. Alternatively it may be used with a core rod to produce a trench within normal index cladding. The completed preform is inserted into the apparatus of FIG. 9 and optical fiber drawn.

EXAMPLE 2

A porous VAD boule, normally used for a standard single mode preform, is heated in stages in He to 1100° C. in 7 hours, then dehydrated at that temperature with He/10% chlorine. After cooling to 1000° C., it is treated in He/10% $SiF_4$ for 30 minutes to predeposit fluorine on the surface of the particles. The predeposited porous body is then heated to 1200–1550° C. for drive-in/consolidation. The VAD core and cladding have been depressed by $\Delta n=0.002$. As will be appreciated by those skilled in the art, this $\Delta n^-$ was obtained using a $SiF_4$ treatment of 30 minutes, which compares favorably with the conventional equilibrium doping process in which treatment at the equilibrium partial pressure of $SiF_4$ of $2\times10^{-3}$ atmospheres requires 20 hours (assuming 100% efficiency, not typical in a production process).

In the foregoing description, the source of fluorine is $SiF_4$. As evident to those skilled in the art, other sources of fluorine may be used. For example, $SiHF_3$, $SiH_2F_2$, $SF_6$, $CF_4$, may also be suitable. These will result in index depression equivalent to that produced by $SiF_4$. However, instead of contending with $SiF_4$ as low as $10^{-9}$ atmospheres, low temperature F doping can be regulated to provide the desired index depression at $SiF_4$ partial pressures above 1% and typically 10% or more. As indicated earlier, the fluorine predeposits on the individual particles as primarily a molecular species. The drive-in mechanism primarily involves diffusion of atomic fluorine. To amplify this important distinction, which is a main characteristic of the invention, the predeposition step is described as involving predeposition of fluorine, and the drive-in as diffusion of fluorine.

The process described herein is especially useful for producing large sol-gel optical fiber preforms. Large sol-gel bodies in current commercial parlance means bodies with a weight greater than 5 kg. The production of such large optical preforms by sol-gel techniques has presented a major challenge, largely because the time required for doping these large preforms by the equilibrium technique is prohibitively long. Thus the invention, when placed in this commercial context, provides an especially unobvious advantage. Preforms this large typically have a diameter greater than 50 mm, and frequently greater than 75 mm.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the claims.

What is claimed is:

1. Process for the manufacture of optical fibers comprising:

preparing an optical fiber preform, heating the preform to the softening temperature, and drawing an optical fiber from the optical fiber preform wherein the optical fiber preform is produced by steps including:

preparing a porous silica body of silica particles, heating the porous silica body in an atmosphere of a fluorine compound to produce a fluorine doped preform region with a refractive index change $\Delta n$, the invention characterized in that:

the atmosphere has a partial pressure of fluorine compound that is at least five times greater than the equilibrium partial pressure p expressed by $\Delta n \sim p^{1/4}$ the temperature of the atmosphere is maintained below 1000° C.

2. The process of claim 1 including the additional step of heating the porous silica body at a temperature greater than 1300° C., in an atmosphere devoid of fluorine, to react the fluorine compound and consolidate the porous silica body into the preform.

3. The process of claim 1 wherein the fluorine atmosphere comprises $SiF_4$.

4. The process of claim 3 wherein the fluorine atmosphere is greater than 10% $SiF_4$.

5. A process for the manufacture of an optical fiber preform comprising:

preparing a porous silica body of silica particles, heating the porous silica body in an atmosphere of a fluorine compound to produce a fluorine doped preform region with a refractive index change $\Delta n$, the invention characterized in that:

the atmosphere has a partial pressure of fluorine compound that is at least five times greater than the equilibrium partial pressure p expressed the temperature of the atmosphere is maintained below 1000° C.

6. The process of claim 5 including the additional step of heating the porous silica body at a temperature greater than 1300° C., in an atmosphere devoid of fluorine, to react the fluorine compound and consolidate the porous silica body into the preform.

7. The process of claim 6 wherein the fluorine atmosphere comprises $SiF_4$.

8. The process of claim 7 wherein the fluorine atmosphere is greater than 10% $SiF_4$.

* * * * *